May 10, 1927.　　　　　　　　　　　　　　　　　　1,628,239
H. S. GERMOND, JR., ET AL
ELEVATING APPARATUS
Filed July 24, 1925　　　　4 Sheets-Sheet 3
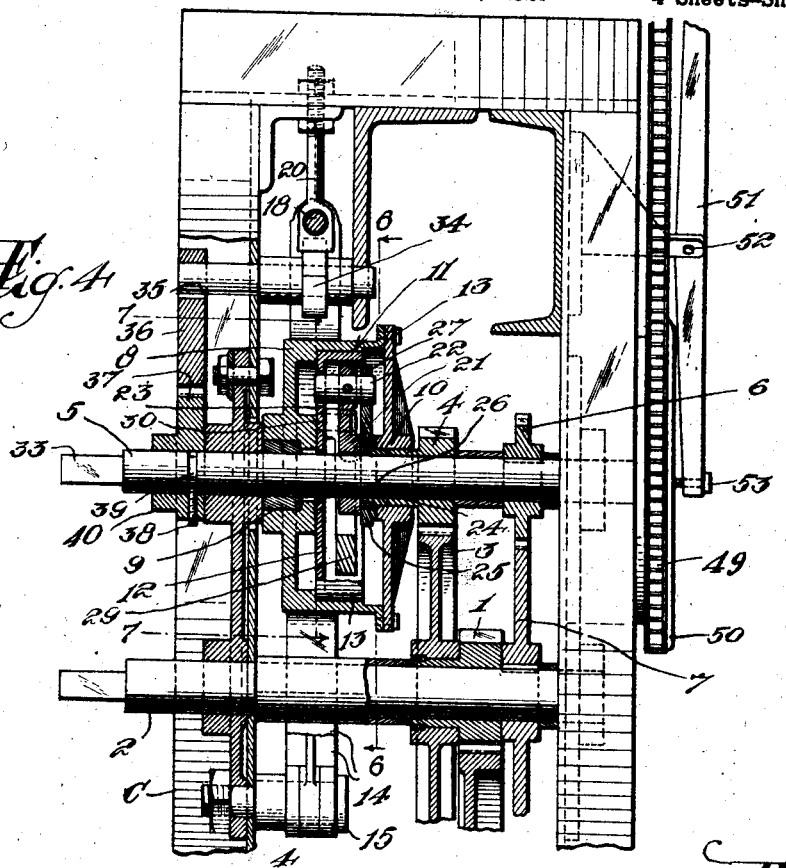
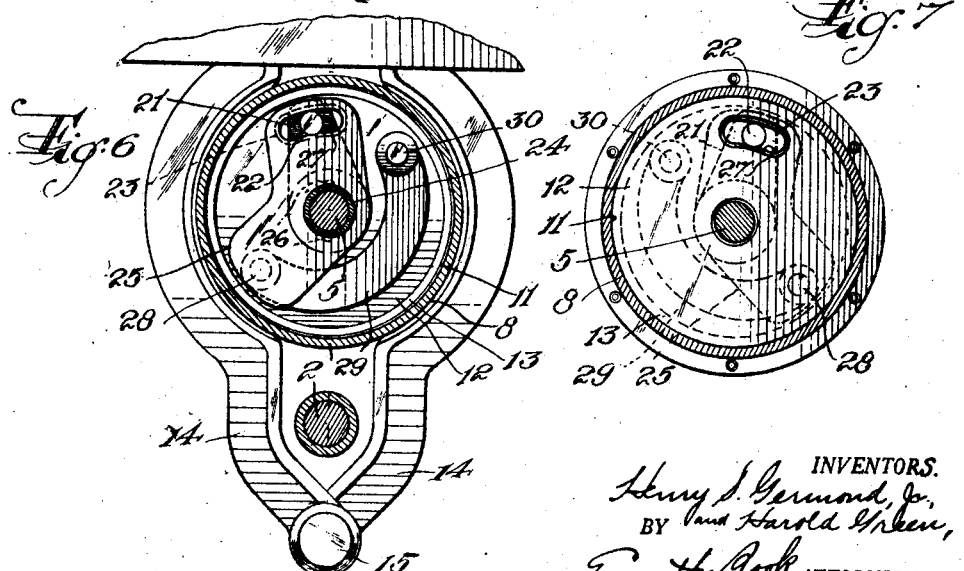
INVENTORS.
Henry S. Germond, Jr.
BY and Harold Green,
Everett Rook, ATTORNEYS.

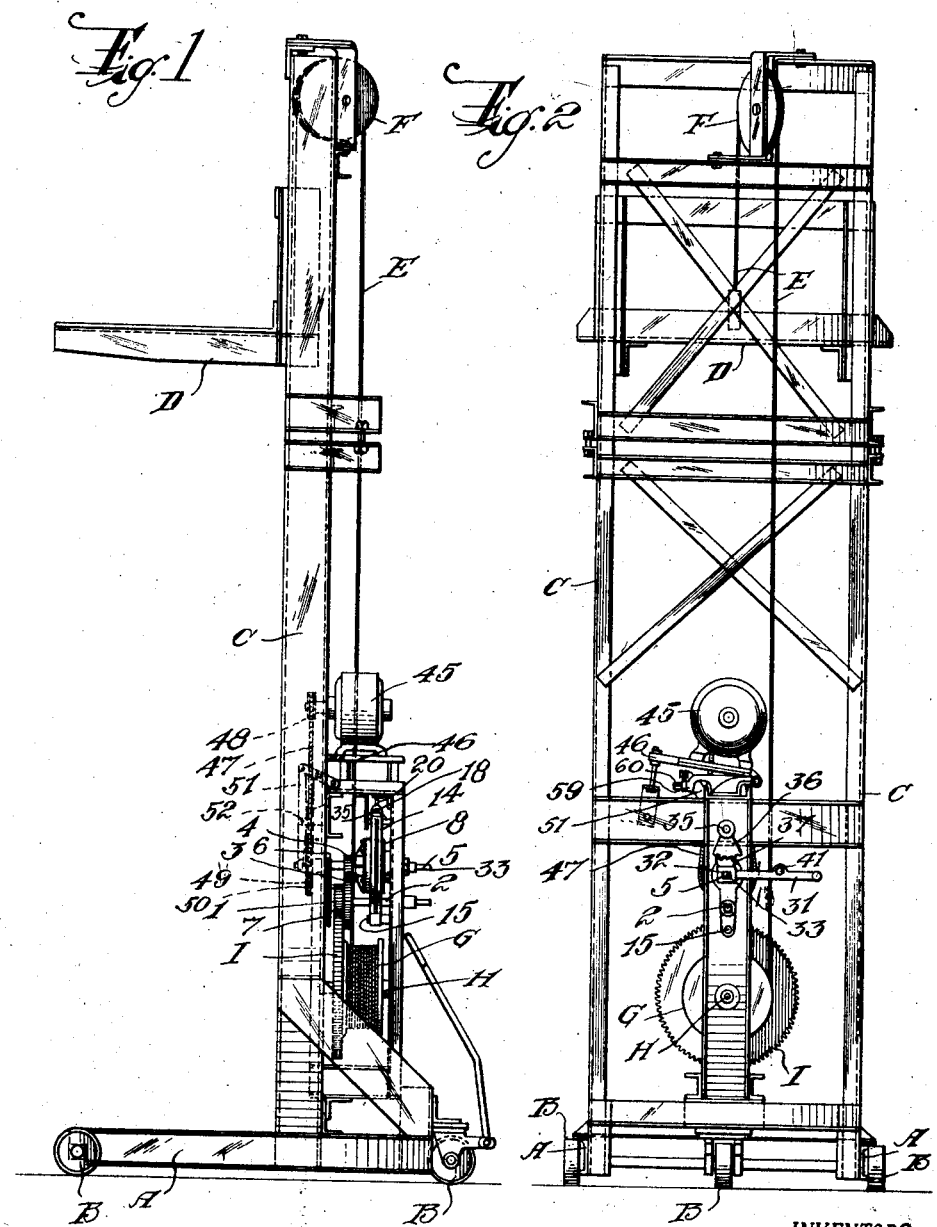

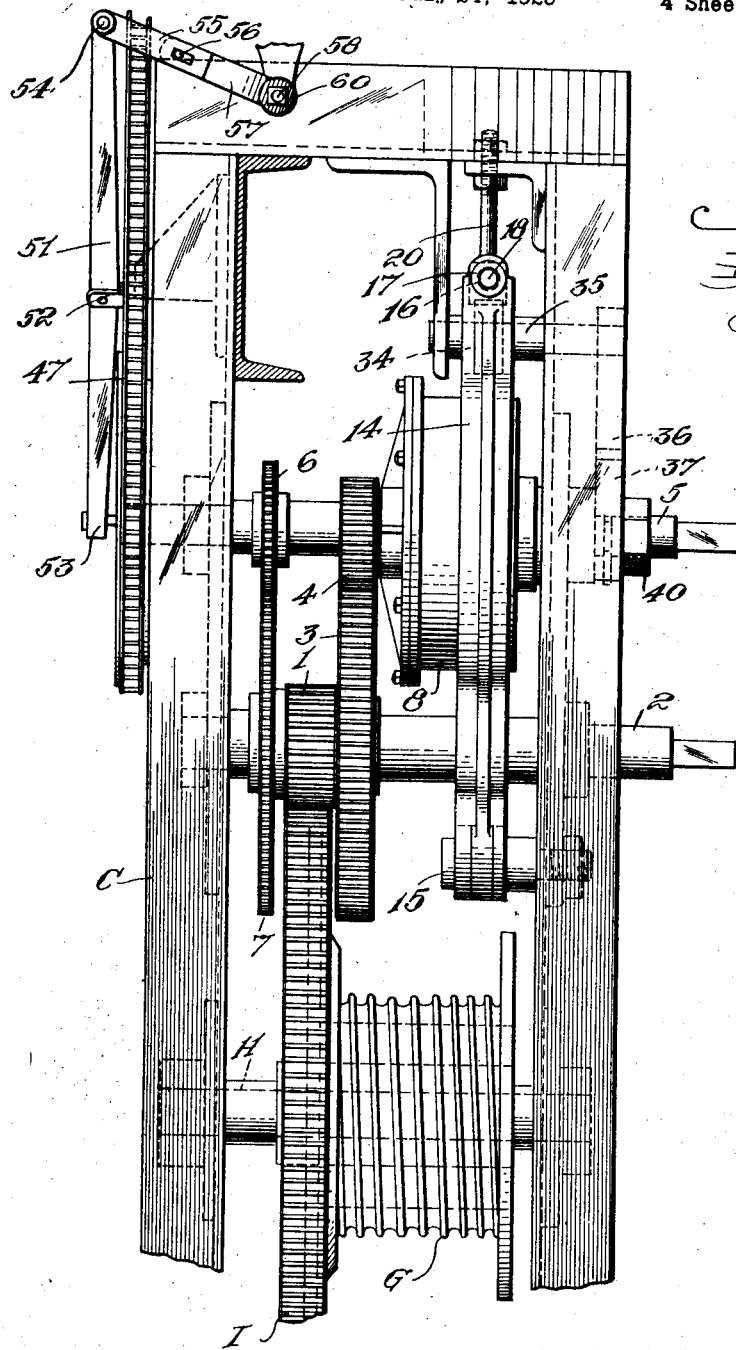

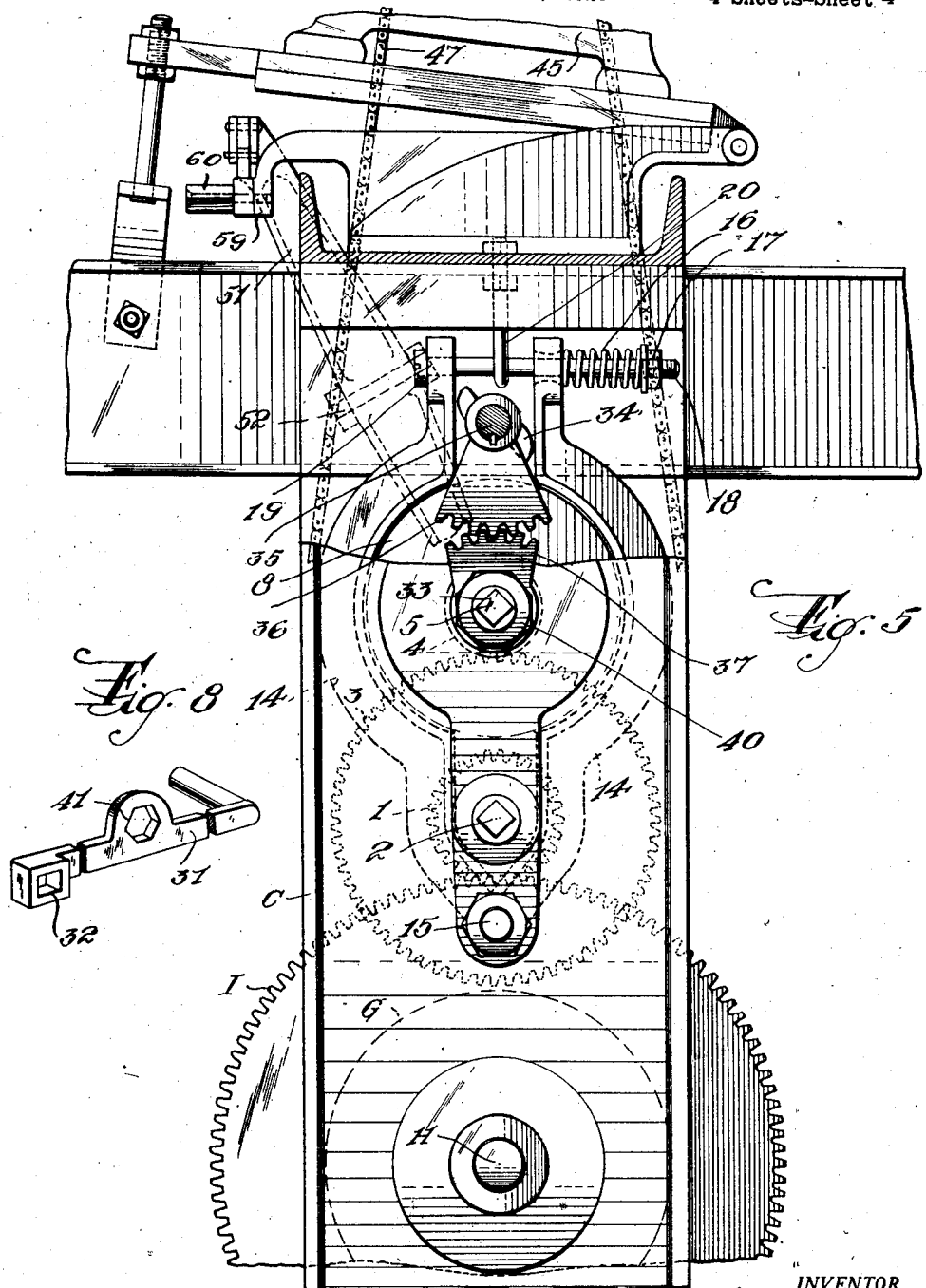

Patented May 10, 1927.

1,628,239

UNITED STATES PATENT OFFICE.

HENRY S. GERMOND, JR., OF BAYONNE, NEW JERSEY, AND HAROLD GREEN, OF YONKERS, NEW YORK, ASSIGNORS TO SAID GERMOND.

ELEVATING APPARATUS.

Application filed July 24, 1925. Serial No. 45,803.

This invention relates particularly to elevating apparatus of the tiering machine type, for example, as shown in United States Patent No. 1,044,008 of November 12, 1912, but also is susceptible of use in other kinds of elevating and hoisting devices.

The invention contemplates the provision of an elevating apparatus which shall be substantially noiseless in operation, which can be operated manually or by motive power, with which a load can be lowered smoothly and gradually either manually or by gravity and under full control of the operator, which at all times shall be safe and dependable even in the hands of an unskilled or careless operator, and which shall be simple in construction and operation durable and long-lived even under severe usage.

Another object of the invention is to provide in elevating apparatus a novel and improved noiseless friction brake mechanism whereby a load may be raised either manually or by power and held by said brake mechanism at any desired elevation, said brake mechanism permitting the load to be lowered either manually or by gravity, smoothly and gradually and under full control of the operator.

A further object is to provide such a brake mechanism including a brake member to be mounted for rotation on a driven shaft of an elevating apparatus and which is always held against rotation in both directions except when manually released, a driven member of the elevating apparatus rotatable on said shaft, a friction member rotatable relatively to said driven member coaxially therewith to frictionally cooperate with said brake member, said driven member and said friction member being pivotally connected to opposite ends of a link substantially 180° apart, and a power transmitting member connected to said shaft for simultaneously rotating said two members in either of opposite directions but permitting relative movement thereof when power is relieved from said transmitting member to cause frictional jamming of said friction member on said drum, whereby the elevating apparatus may be positively driven to raise or lower a load and the load automatically held against descent when the transmitting member ceases to operate, as by the operator releasing his hold on a crank, the same apparatus enabling the load to descend by gravity under manual control when said brake member is manually released.

Other objects are to provide said brake member in the form of a hollow drum normally held against rotation in both directions by spring-pressed brake jaws which are manually releasable against the influence of the spring to permit such rotation whereby to permit descent of the load by gravity constantly under control of the operator, and mount said friction member and said transmitting member within said drum whereby said parts are protected from dirt and injury and a compact arrangement obtained; to provide such a construction whereby either a motor or a hand operated crank may be connected to said shaft for driving elevating apparatus and the same brake mechanism serves for both motor and manual operation, and to obtain other results and advantages as may be brought out by the following description.

Referring to the accompanying drawings, in which the same reference characters designate corresponding and like parts throughout the several views.

Figure 1 is a side elevation of a portable elevator or tiering machine embodying our invention;

Figure 2 is a front elevation thereof;

Figure 3 is an enlarged fragmentary side elevation of the hoisting apparatus and brake mechanism;

Figure 4 is a partial transverse vertical section and partial side elevation of the apparatus as illustrated in Figure 3, viewing the same from a position at 180° to that shown in Figure 3;

Figure 5 is an enlarged fragmentary front elevation of the apparatus as illustrated in Figure 3, portions being broken away;

Figure 6 is a transverse vertical sectional view, taken on the line 6—6 of Figure 4, looking in the direction of the arrows;

Figure 7 is a similar view, taken on the line 7—7 of Figure 4, looking in the direction of the arrows, and Figure 8 is a perspective view of the crank handle for manually operating the hoisting apparatus.

Specifically describing the embodiment of the invention illustrated on the drawings, the reference character A designates a truck mounted on wheels B and having a vertical elevator frame C mounted thereon. An elevating platform D is vertically movable in guideways provided in the frame C and raised and lowered by means of a cable E passing over a sheave F mounted upon the top of the frame C with one end connected to the platform and the other end wound upon a cable drum G which is rotatable manually or by means of power. The apparatus so far described in detail is old and well-known in the art, and no claim to novelty is made thereon.

The drum G is mounted upon a shaft H and driven through a gear I which meshes with a pinion 1 loosely rotatable on a driving shaft 2 and fixedly connected to a gear 3 which in turn meshes with a pinion 4 loosely rotatable upon a second driving shaft 5. The shafts 2 and 5 are geared together by a pinion 6 keyed on the shaft 5 meshing with a gear 7 keyed on the shaft 2, so that rotation of either of said shafts will cause rotation of the other shaft.

In accordance with the invention, a novel and improved friction brake mechanism is interposed between each of the shafts 2 and 5 and the cable drum G, so that the cable drum may be rotated in either direction to raise or lower the platform D and be held by the brake mechanism in any position and lowered either by gravity or manually and under full control of the operator. This brake mechanism includes a hollow casing or drum 8 loosely rotatable coaxially with the shaft 5 upon bearings 9 and 10 (see Fig. 4). On its inner periphery, the drum is formed with a friction braking surface 11 with which is adapted to cooperate a brake shoe 12 which is in the form of a disk having a peripheral flange 13. The brake shoe 12 is loosely rotatable relatively to the shaft 5 and is arranged for slight lateral or radial movement relatively to the shaft and the braking surface 11, there being a slight clearance between the brake shoe and the braking surface 11 when the shoe is coaxial with said braking surface. The brake drum 8 is normally held stationary or against rotation relatively to the shaft 5, by means of spring actuated brake jaws 14 which are pivotally connected at one end to a bolt 15 secured to the frame C and embrace the outer periphery of the brake drum, as clearly shown in Figures 3, 5 and 6. The other ends of the brake jaws are normally influenced toward each other and into frictional contact with the brake drum by means of a compression spring 16 interposed between one of the jaws, and an adjusting nut 17 arranged on a bolt 18 passing loosely through alined openings in the ends of the jaws 14 and having at its other end a head 19 to engage the other jaw 14. The bolt 18 is preferably supported in a substantially horizontal position by means of a hanger 20 mounted in the frame C.

Within the brake drum 8 and keyed to the shaft 5 is a crank arm 21 which has fixedly secured in its outer end a pin 22 disposed substantially parallel with the shaft 5 and projecting from opposite sides of the crank arm 21. The brake shoe 12 is formed with an arcuate slot 23 substantially concentric with the shoe and loosely receiving one end of the pin 22. The pinion 4 is provided with an integral extension 24 which projects into the brake drum 8 through the bearing 10, and a bell crank 25 is keyed to said extension 24 in any suitable manner as by the screws 26. One arm of said bell crank 25 is formed with an opening 27 to loosely receive the end of the pin 22 opposite that arranged in the slot 23 of the brake shoe. The other arm of the bell crank 25 has pivotally connected thereto, as at 28, one end of a curved link 29 the other end of which is pivotally connected at 30 to the brake shoe at a point substantially 180° from the pivotal connection 28. The curvature of the link 29 provides a clearance between it and the shaft 5 and crank arm 21.

In operation of the apparatus so far described, remembering that the brake jaws 14 normally hold the brake drum 8 against rotation, to raise the platform D at a low speed and with the maximum lifting capacity, the shaft 5 is rotated in a clock-wise direction. This rotation may be manually by means of a crank handle 31 which has a polygonal socket 32 to fit a corresponding polygonal end 33 on the shaft. As the shaft starts rotation, the crank arm 21 rotates therewith and engages one end of the slot 23 in the brake shoe which through the link 29 throws the brake shoe into a position substantially coaxial with the braking surface 11, whereby rotation of the brake shoe takes place without any frictional contact thereof with the braking surface 11. Substantially simultaneously, the pin 22 in the crank arm 21 through its engagement with the bell crank 25, produces rotation of the pinion 4 which through the gear 3, pinion 1 and cable drum gear I, rotates said cable drum to wind the cable thereon. When rotation of the shaft 5 is stopped, as by the operator releasing his hold upon the crank handle 31, the weight of the platform causes a reverse rotation of the gearing 6, 1, 3, 4 and the crank arm 25, which action through the pin 22, crank arm 21 and link 29 throws the brake shoe eccentrically of the shaft 5 and into frictional contact with the braking surface 11. The platform D is thus automatically held in its elevated position. To manually lower the platform, the shaft 5 is rotated in the opposite direction, that is counterclock-wise, whereupon the brake shoe 12 is again, through the action of the crank arm 21 and link 29, moved into coaxial relation with the braking surface 11 and clear thereof. The platform D can thus be lowered under full control of the operator and the lowering operation stopped at any desired point, since should the operator release his hold upon the crank, the weight of the platform through the gearing above described would immediately and automatically throw the brake shoe 12 into frictional engagement with the braking surface 11 and stop rotation of the cable drum. Similarly, should the platform with a heavy load tend to descend too rapidly, the brake shoe 12 will be thrown into sliding frictional contact with the braking surface 11 so as to retard the descent of the platform. There is no possibility of the platform getting out of control of the operator during either the elevating or lowering operation.

When it is desired to lower the platform rapidly by action of gravity, the brake jaws 14 are released from the brake drum 8, whereupon the drum 8 rotates with the shaft 5 and brake shoe 12 to permit the platform to descend by gravity.

For releasing the brake jaws from the brake drum 8, we preferably utilize a double cam 34 mounted on a shaft 35 journaled in the frame C between the ends of the brake jaws 14, as clearly shown in Figures 4 and 5. A gear segment 36 is keyed upon the shaft 35 and meshes with a second gear segment 37 rotatably mounted upon the shaft 5 by means of a screw 38 engaging a grove 39 in the shaft. The gear segment 37 is provided with a coaxial polygonal projection 40 which is of a shape and size different from that of the opening 32 in the crank handle 31. The crank handle is formed with a second opening 41 to engage the polygonal projection 40, whereby the gear segment 37 may be rotated and in turn rotate the gear segment 36 and shaft 35 so that the double cam 34 is forced into engagement with the brake jaws to spread them against the influence of the spring 16. Obviously, the spring 16 will automatically force the jaws toward each other and into frictional engagement with the drum 8 upon release of the crank handle 31 by the operator. Accordingly, there is no danger of the operator leaving the brake jaws 14 in released position, and therefore the whole brake mechanism is practically fool proof and in operative position at all times except when manually held in released position. Obviously, the speed of descent of the platform can be readily controlled by the operator by more or less opening of the brake jaws which in turn is accomplished by greater or less swinging of the crank handle.

When it is desired to raise or lower the platform at a high speed and less lifting capacity is necessary, the crank handle 31 may be applied to the shaft 2. Rotation of the shaft 2 in counterclock-wise direction will through the gears 7 and 6 cause rotation of the shaft 5 in clock-wise direction just as if the crank handle were applied to the shaft 5, but the speed of rotation will be higher, due to the ratio of the gearing. Accordingly, the brake mechanism 11, 12, 21, 22, 25, 29 will operate to hold the platform in any elevated position and permit lowering of the platform under manual control upon actuation of either of the shafts 2 or 5.

Where desired, the elevating apparatus may be motor driven. As an illustration, an electric motor 45 may be mounted upon a suitable support 46 on the frame C and geared to the shaft 5 through a chain 47 connected to a sprocket 48 on the motor shaft and a sprocket 49 on one of the parts of a multiple disk clutch 50 of known construction. The clutch 50 is operated by means of a lever 51 pivoted intermediate its ends, as at 52, upon the frame C and engaging at one end one of the parts of the clutch, as at 53. The other end of the lever 51 is pivotally connected, as at 54, to one part 55 of a toggle which has a pin and slot connection 56 with the other part 57 of the toggle (see Figure 3). The part 57 is pivoted at 58 upon a suitable bracket 59 and is formed with a polygonal projection 60 to fit the opening 32 in the crank handle 31. Obviously, rotation of the part 57 by the crank handle 31 will cause movement of the lever 53 to close the clutch 50 and provide a driving connection between the motor 45 and the shaft 5. When the motor drive is being used for elevating the platform, the operation of the brake mechanism is identical with that incident to manual rotation of the shaft 5, the platform being automatically held in any elevated position upon stopping of the motor. Of course, the motor would not ordinarily be utilized for lowering the platform, although if it were, the brake mechanism would operate in a manner identical with that incident to lowering of the platform through manual rotation of the shaft 5.

While we have shown and described one preferred embodiment of our invention, it will be understood that this is primarily for the purpose of illustrating the principles of the invention and that many modifications and changes can be made in the details of construction without departing from the spirit or scope of the invention. Also, the particular brake mechanism illustrated is susceptible of use with other types of elevating apparatus than that herein described. Therefore, we do not desire to be understood as limiting ourselves except as required by the following claims when construed in the light of the prior art.

Having thus described the invention, what we claim is:

1. An elevating apparatus comprising a movable load support, a shaft, an operative connection between said shaft and said support whereby to raise and lower the support upon rotation of the shaft in opposite directions, a rotatable releasable brake member held against rotation at all times except when positively held released, and brake mechanism cooperating with said brake member to hold said shaft against rotation under influence of gravity on said load support in the direction to lower the load and operable to release said shaft automatically upon rotation of said shaft under influence of force applied thereto in either direction to permit raising and lowering of the load support respectively under influence of said force.

2. In an elevating apparatus, the combination of means for raising a load comprising a cable, a drum for winding said cable, two driving shafts, a driving connection between both of said shafts and said drum whereby said drum can be rotated at different speeds from said shafts, and manually releasable brake mechanism operable at all times except when manually held released to hold both said shafts against rotation under influence of gravity on said load in the direction to lower the load and operable to release said shafts automatically upon rotation of either of said shafts under influence of force applied thereto in either direction to permit raising and lowering of the load respectively under influence of said force.

3. In an elevating apparatus, the combination of means for raising a load comprising a shaft, a manually releasable brake member held against rotation at all times except when manually held released, and brake mechanism cooperating with said brake member to hold said shaft against rotation in the direction to lower the load and operable to release said shaft automatically upon rotation of said shaft under influence of force applied thereto in either direction to permit raising and lowering of the load respectively under influence of said force, said brake mechanism also cooperating with said brake member so that the release of said brake member permits descent of said load under the influence of gravity.

4. In an elevating apparatus, the combination of means for raising a load comprising a shaft, a brake member, releasable means for holding said brake member stationary, and brake mechanism cooperating with said brake member to hold said shaft against rotation in the direction to lower the load and operable to release said shaft automatically upon rotation of said shaft under influence of force applied thereto in either direction to permit raising and lowering of the load respectively under influence of said force, said brake mechanism also cooperating with said brake member so that the release of said brake member permits descent of said load under the influence of gravity.

5. In an elevating apparatus, the combination of means for raising a load comprising a shaft, a brake member rotatable relatively to and coaxially with said shaft, releasable means for holding said brake member against rotation, and brake mechanism cooperating with said brake member to hold said shaft against rotation in the direction to lower the load and operable to release said shaft automatically upon rotation of said shaft under influence of force applied thereto in either direction to permit raising and lowering of the load respectively under influence of said force, said brake mechanism also cooperating with said brake member so that the release of said brake member permitting descent of said load under the influence of gravity.

6. In an elevating apparatus, the combination of means for raising a load comprising a shaft, a brake member rotatable relatively to and coaxially with said shaft, manually releasable means to hold said brake member stationary except when manually held released, a brake shoe to releasably frictionally engage said brake member, and an operative connection between said shaft and said brake shoe to hold said shaft against rotation in the direction to permit descent of the load and operable to release said shaft automatically upon rotation of the shaft under influence of force applied thereto in either direction to permit raising and lowering of the load respectively under influence of said force, the release of said brake member permitting descent of the load under the influence of gravity.

7. An elevating apparatus comprising a movable load support, a shaft, an operative connection between said shaft and said support whereby to raise and lower the support upon rotation of the shaft in opposite directions, a stationary friction brake member, and an operative connection between said shaft and said brake member including a friction shoe normally to frictionally engage said brake member and prevent rotation of said shaft in the direction to lower said support and operable out of engagement with said brake member to release said shaft automatically upon rotation of said shaft in either direction to permit raising and lowering of said support respectively.

8. The apparatus set forth in claim 7 in which the friction brake member is held stationary by normally releasable means which operates to hold the brake member at all times except when manually held in releasing position.

9. An elevating apparatus comprising a movable load support, a shaft, an operative connection between said shaft and said support whereby to raise and lower the support upon rotation of the shaft in opposite directions, a friction brake member rotatable relatively to and coaxially with said shaft, manually releasable means for holding said member against rotation except when manually held released, a brake shoe to normally frictionally engage said brake member, and an operative connection between said brake shoe and said shaft to normally cause frictional engagement of said shoe with said member to hold said shaft against rotation in the direction to lower said load support, and operable automatically upon rotation of said shaft in either direction to move said brake shoe out of engagement with said brake member.

10. An elevating apparatus comprising a movable load support, a shaft, an operative connection between said shaft and said support whereby to raise and lower the support upon rotation of the shaft in opposite directions, a hollow cylindrical stationary brake drum having an interior annular friction braking surface, a brake shoe within said drum to normally frictionally engage said braking surface to rotate coaxially with said shaft and capable of radial movement relative thereto, and an operative connection between said brake shoe and said shaft to normally cause frictional engagement of said shoe with said braking surface of said brake drum and operable automatically upon rotation of said shaft in either direction to move said brake shoe out of engagement with said braking surface.

11. An elevating apparatus comprising a movable load support, a shaft, an operative connection between said shaft and said support whereby to raise and lower the support upon rotation of the shaft in opposite directions, a hollow cylindrical brake drum rotatable relatively to and coaxially with said shaft and having an interior annular friction braking surface, manually releasable means for holding said drum against rotation, a brake shoe within said drum to normally frictionally engage said braking surface to rotate coaxially with said shaft and capable of radial movement relative thereto, and an operative connection between said brake shoe and said shaft to normally cause frictional engagement of said shoe with said braking surface of said brake drum and operable automatically upon rotation of said shaft in either direction to move said brake shoe out of engagement with said braking surface.

12. The apparatus set forth in claim 11 in which said hollow brake drum is held stationary by releasable means which operates to hold the brake drum all times except when held in releasing position.

13. An elevating apparatus comprising a movable load support, a shaft, an operative connection between said shaft and said support whereby to raise and lower the support upon rotation of the shaft in opposite directions, a hollow cylindrical brake drum rotatable relatively to and coaxially with said shaft and having an interior annular friction braking surface, manually releasable means for holding said drum against rotation, a circular brake disk within said drum of a diameter less than that of said braking surface to frictionally engage said braking surface to rotate coaxially with said shaft and capable of radial movement relative thereto, said brake disk having a substantially concentric arcuate slot, a projection on said shaft loosely arranged within said slot, and means for mounting said brake disk so that it is normally forced into frictional engagement with said braking surface and automatically moved out of engagement with said surface upon rotation of said shaft in either direction.

14. An elevating apparatus comprising a movable load support, a shaft, an operative connection between said shaft and said support including a member to be driven from said shaft and connected to said load support whereby to raise and lower said support upon rotation of said shaft in opposite directions, a stationary friction brake member, a brake shoe to frictionally engage said brake member, a link pivotally connected to said brake shoe and said member to be driven at points 180° apart, whereby said shoe is normally forced into frictional engagement with said brake member, and an operative connection between said shaft and said brake shoe and said member to be driven whereby to move said brake shoe out of engagement with said brake member upon rotation of said shaft in either direction and raise and lower said load support.

15. The apparatus set forth in claim 14 in which said friction brake member is held stationary by releasable means which operates to hold the brake member all times except when held in releasing position.

16. An elevating apparatus comprising a movable load support, a shaft, an operative connection between said shaft and said support including a member to be driven from said shaft and connected to said load support whereby to raise and lower said support upon rotation of said shaft in opposite directions, a stationary hollow cylindrical brake drum having an interior annular friction braking surface, a circular brake disk of a diameter less than that of said surface within said drum to frictionally engage said surface to rotate coaxially with said shaft and move laterally relatively thereto, a link pivotally connected to said brake disk and said member to be driven at points 180° apart whereby said disk is normally forced into frictional engagement with said braking surface, and an operative connection between said shaft and said brake disk and said member to be driven whereby to move said brake disk out of engagement with said braking surface upon rotation of said shaft in either direction and raise and lower said load support.

17. The apparatus set forth in claim 16 in which said brake drum is held stationary by releasable means which operates to hold the brake drum all times except when held in releasing position.

18. An elevating apparatus comprising a movable load support, a shaft, an operative connection between said shaft and said support including a member to be driven from said shaft and connected to said load support whereby to raise and lower said support upon rotation of said shaft in opposite directions, a stationary hollow cylindrical brake drum having an interior annular friction braking surface, a circular brake disk of a diameter less than that of said surface within said drum to frictionally engage said surface to rotate coaxially with said shaft and move laterally relatively thereto, a link pivotally connected to said brake disk and said member to be driven at points 180° apart whereby said disk is normally forced into frictional engagement with said braking surface, said disk having a slot, a crank arm on said shaft having a pin therein projecting therefrom parallel with said shaft with one end loosely arranged within said slot, and an operative connection between said shaft and said member to be driven whereby to move said brake shoe out of engagement with said brake drum upon rotation of said shaft in either direction and raise and lower said load support.

19. An elevating apparatus comprising a movable load support, a shaft, an operative connection between said shaft and said support including a member to be driven from said shaft and connected to said load support whereby to raise and lower said support upon rotation of said shaft in opposite directions, a stationary hollow cylindrical brake drum having an interior annular friction braking surface, a circular brake disk of a diameter less than that of said surface within said drum to frictionally engage said surface to rotate coaxially with said shaft and move laterally relatively thereto, a link pivotally connected to said brake disk and said member to be driven at points 180° apart whereby said disk is normally forced into frictional engagement with said braking surface, said disk having a slot, a crank arm on said shaft having a pin thereon projecting therefrom parallel with said shaft with one end loosely arranged within said slot, said member to be driven having an opening to receive the other end of said pin to operatively connect said shaft and said member whereby to move said brake shoe out of engagement with said brake drum upon rotation of said shaft in either direction and raise and lower said load support.

20. A friction brake mechanism comprising a driving member and a driven member, an operative connection between said driving member and said driven member, a stationary member having an annular friction braking surface, a circular brake disk of a diameter less than that of said braking surface to cooperate with said braking surface, said disk being rotatable coaxially with said braking surface and capable of lateral movement relatively thereto, a link pivotally connected to said disk and said driven member at points 180° apart whereby said disk is forced into frictional engagement with said braking surface upon relative movement of said disk and said driven member, an operative connection between said driving member and said disk to cause movement of said disk out of engagement with said braking surface upon rotation of said driving member in either direction.

21. A friction brake mechanism comprising a driving shaft, a member to be driven, a stationary hollow cylindrical brake drum coaxial with said shaft and having an interior annular friction braking surface, a circular brake disk of less diameter than said braking surface to cooperate therewith, said disk being rotatable coaxially with said shaft and movable laterally relatively thereto, a bell-crank fixed upon said member to be driven and having an opening in one arm, a link pivotally connected to said disk and one arm of said bell-crank at points 180° apart whereby said disk is forced into frictional engagement with said braking surface upon relative movement of said disk and said member to be driven, said disk having a slot, a crank arm fixed on said shaft between said disk and said bell-crank and having opposite projections parallel to said shaft one of which is loosely arranged in said slot in the disk and the other in said opening in said bell-crank.

22. A friction brake mechanism comprising a stationary substantially cylindrical hollow closed brake drum having an interior annular friction braking surface, a driving shaft passing coaxially through said drum, a power transmitting member to be driven from said shaft rotatably mounted on said shaft within said drum and having a portion extending from one end of said drum, a circular brake disk of less diameter than said braking surface to cooperate therewith, said disk being rotatable coaxially with said shaft and movable laterally relatively thereto, a bell-crank fixed upon said member to be driven and having an opening in one arm, a link pivotally connected to said disk and one arm of said bell-crank at points 180° apart whereby said disk is forced into frictional engagement with said braking surface upon relative movement of said disk and said member to be driven, said disk having a slot, a crank arm fixed on said shaft between said disk and said bell-crank and having opposite projections parallel to said shaft one of which is loosely arranged in said slot in the disk and the other in said opening in said bell-crank.

23. The brake mechanism set forth in claim 20 in which said brake member is rotatable coaxially with and relatively to said shaft and held stationary by manually releasable means.

HENRY S. GERMOND, Jr.
HAROLD GREEN.